(12) United States Patent
Yin (10) Patent No.: US 11,742,684 B2
(45) Date of Patent: Aug. 29, 2023

(54) CHARGING CONTROL CIRCUIT, CHARGING CIRCUIT AND CHARGING CONTROL METHOD

(71) Applicant: VIVO MOBILE COMMUNICATION CO., LTD., Guangdong (CN)

(72) Inventor: Yunpeng Yin, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 339 days.

(21) Appl. No.: 17/241,939

(22) Filed: Apr. 27, 2021

(65) Prior Publication Data

US 2021/0249887 A1 Aug. 12, 2021

Related U.S. Application Data

(63) Continuation of application No. PCT/CN2019/113593, filed on Oct. 28, 2019.

(30) Foreign Application Priority Data

Oct. 31, 2018 (CN) .......................... 201811284768.0

(51) Int. Cl.
*H02J 7/00* (2006.01)

(52) U.S. Cl.
CPC ...... *H02J 7/007182* (2020.01); *H02J 7/0047* (2013.01); *H02J 2207/30* (2020.01)

(58) Field of Classification Search
None
See application file for complete search history.

(56) References Cited

U.S. PATENT DOCUMENTS 10,355,497 B2 * 7/2019 Kadirvel ............... H02J 7/0013
10,749,353 B2 * 8/2020 Tsuruta .................. B25F 5/021
(Continued)

FOREIGN PATENT DOCUMENTS

| CN | 201270319 Y | 7/2009 |
| CN | 201563242 U | 8/2010 |

(Continued)

OTHER PUBLICATIONS

International Search Report and Written Opinion of the International Searching Authority regarding International Patent Application No. PCT/CN2019/113593, dated Feb. 5, 2020. Translation provided by Bohui Intellectual Property.

(Continued)

*Primary Examiner* — Arun C Williams
(74) *Attorney, Agent, or Firm* — Harness, Dickey & Pierce, P.L.C.

(57) ABSTRACT

A charging control circuit includes: a communications interface housing, a communications interface, and a control sub-circuit the communications interface housing includes a first conductive part, a second conductive part, and an insulating part, and the insulating part is disposed between the first conductive part and the second conductive part; the first conductive part is connected to a first voltage terminal; the second conductive part is connected to a second voltage terminal; a first voltage accessed at the first voltage terminal is greater than a second voltage accessed at the second voltage terminal; and when it is detected that a voltage of the first conductive part changes from the first voltage to the second voltage, starting of a power supply apparatus electrically connected to the communications interface, so that the power supply apparatus provides a charging voltage to the communications interface.

20 Claims, 5 Drawing Sheets

(56) References Cited

U.S. PATENT DOCUMENTS

| | | | |
|---|---|---|---|
| 2005/0088141 A1* | 4/2005 | Lee | H02J 5/00 320/114 |
| 2009/0058356 A1* | 3/2009 | Lee | H02J 7/0013 320/106 |
| 2009/0309426 A1* | 12/2009 | Hsieh | H02J 7/0068 307/113 |
| 2013/0162222 A1 | 6/2013 | Ke et al. | |
| 2013/0175979 A1* | 7/2013 | Chang | H02J 7/0042 320/107 |
| 2013/0286694 A1 | 10/2013 | Shi et al. | |
| 2015/0303724 A1 | 10/2015 | Lin et al. | |
| 2018/0018934 A1 | 1/2018 | Lim et al. | |
| 2018/0301918 A1 | 10/2018 | Lupo et al. | |

FOREIGN PATENT DOCUMENTS

| | | |
|---|---|---|
| CN | 202333926 U | 7/2012 |
| CN | 202978308 U | 6/2013 |
| CN | 202978310 U | 6/2013 |
| CN | 103187738 A | 7/2013 |
| CN | 103378524 A | 10/2013 |
| CN | 203261075 U | 10/2013 |
| CN | 203301196 U | 11/2013 |
| CN | 104767270 A | 7/2015 |
| CN | 105576766 A | 5/2016 |
| CN | 107863797 A | 3/2018 |
| CN | 107957966 A | 4/2018 |
| CN | 108465545 A | 8/2018 |
| CN | 207705816 U | 8/2018 |
| CN | 109167420 A | 1/2019 |
| CN | 109215978 A | 1/2019 |
| EP | 3171481 A1 | 5/2017 |
| JP | 2014212658 A | 11/2014 |
| WO | WO-9701103 A1 | 1/1997 |
| WO | WO-2014149809 A2 | 9/2014 |

OTHER PUBLICATIONS

First Office Action regarding Chinese Patent Application No. 201811284768.0, dated Jan. 22, 2020. Translation provided by Bohui Intellectual Property.

Supplementary European Search Report regarding Application No. 19880248.0-1202/3876382; PCT/CN2019/113593, dated Oct. 29, 2021.

* cited by examiner

CHARGING CONTROL CIRCUIT, CHARGING CIRCUIT AND CHARGING CONTROL METHOD

CROSS-REFERENCE TO RELATED APPLICATIONS

This application is a Bypass Continuation Application of PCT/CN2019/113593 filed on Oct. 28, 2019, which claims priority to Chinese Patent Application No. 201811284768.0 filed on Oct. 31, 2018, which are incorporated herein by reference in their entirety.

TECHNICAL FIELD

The present disclosure relates to the field of communications technologies, and in particular, to a charging control circuit, a charging circuit, and a charging control method.

BACKGROUND

Currently, a charging control circuit of a mobile power supply includes an automatic charging control circuit and a manual charging control circuit. A switch is generally disposed on the manual charging control circuit. A user may manually control closing of the switch to manually enable power output. After the mobile power supply is inserted into a charging device, the automatic charging control circuit may automatically detect a load and enable power output. The automatic charging control circuit may be implemented by an integrated circuit (IC) or a detection circuit built by a discrete device. Because a related charging control circuit implemented by the integrated circuit IC or the detection circuit built by the discrete device is relatively complex, reliability of the related charging control circuit is relatively poor.

It can be learned that the related charging control circuit has a problem of relatively poor reliability.

SUMMARY

According to a first aspect, an embodiment of the present disclosure provides a charging control circuit, including:

a communications interface housing, a communications interface, and a control sub-circuit, where the communications interface housing includes a first conductive part, a second conductive part, and an insulating part, and the insulating part is disposed between the first conductive part and the second conductive part;

the first conductive part is connected to a first voltage terminal, and the first voltage terminal is configured to access a first voltage;

the second conductive part is connected to a second voltage terminal, the second voltage terminal is configured to access a second voltage, and the first voltage is greater than the second voltage; and the control sub-circuit is connected to the first conductive part and the communications interface, and is configured to control, when it is detected that a voltage of the first conductive part changes from the first voltage to the second voltage, starting of a power supply apparatus electrically connected to the communications interface, so that the power supply apparatus provides a charging voltage to the communications interface.

According to a second aspect, an embodiment of the present disclosure further provides a charging circuit, including: the foregoing charging control circuit and a power supply apparatus electrically connected to a communications interface of the charging control circuit.

According to a third aspect, an embodiment of the present disclosure further provides an electronic device, including the foregoing charging circuit.

According to a fourth aspect, an embodiment of the present disclosure further provides a charging control method applied to the foregoing charging circuit. The method includes:

when it is detected that a voltage of a first conductive part changes from a first voltage to a second voltage, controlling starting of a power supply apparatus electrically connected to a communications interface, so that the power supply apparatus provides a charging voltage to the communications interface.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Figure 1:
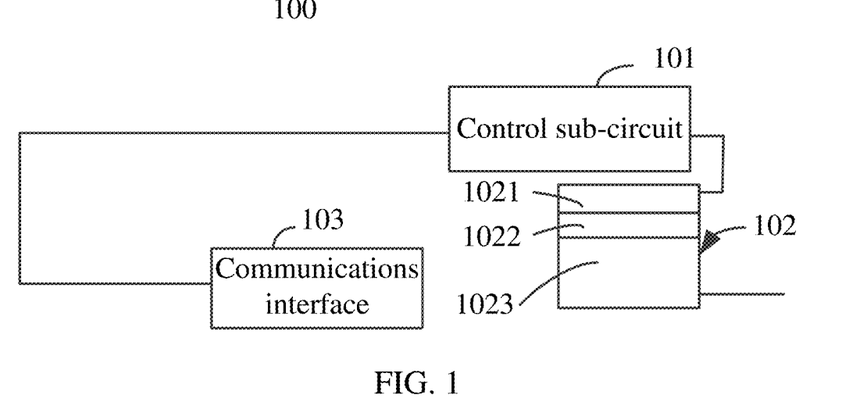
FIG. 1 is a first schematic diagram of a charging control circuit according to an embodiment of the present disclosure.

Referring to FIG. 1, FIG. 1 is a schematic diagram of a charging control circuit according to an embodiment of the present disclosure. As shown in FIG. 1, the charging control circuit 100 includes a communications interface housing 102, a communications interface 103, and a control sub-circuit 101, where the communications interface housing 102 includes a first conductive part 1021, a second conductive part 1023, and an insulating part 1022, and the insulating part 1022 is disposed between the first conductive part 1021 and the second conductive part 1023; the first conductive part 1021 is connected to a first voltage terminal, and the first voltage terminal is configured to access a first voltage; the second conductive part 1023 is connected to a second voltage terminal, and the second voltage terminal is configured to input a second voltage; and the control sub-circuit 101 is connected to the first conductive part 1021 and the communications interface 103, and is configured to control, when it is detected that a voltage of the first conductive part 1021 changes from the first voltage to the second voltage, starting of a power supply apparatus (not shown in the figure) electrically connected to the communications interface 103, so that the power supply apparatus provides a charging voltage to the communications interface 103.

In this embodiment, the power supply apparatus may be a mobile power supply apparatus including a power supply control chip and a charging power supply. The communications interface may include a universal serial bus (USB) interface, and the communications interface housing may be a USB interface housing.

Because the insulating part 1022 is disposed between the first conductive part 1021 and the second conductive part 1023, without assistance of another object, the first conductive part 1021 and the second conductive part 1023 are in a disconnected state. In this case, the voltage accessed by the first conductive part 1021 is the first voltage. When the communications interface 103 accesses a load, the accessed load may conduct the first conductive part 1021 with the second conductive part 1023, so that the voltage of the first conductive part 1021 changes from the first voltage to the second voltage. The accessed load may be a mobile terminal, such as a mobile phone or a tablet computer.

When the control sub-circuit 101 detects that the voltage of the first conductive part 1021 changes from the first voltage to the second voltage, it indicates that a charging wire used to charge the load is accessed onto the communications interface 103, and the charging voltage needs to be provided to the communications interface 103. Therefore, when it is detected that the voltage of the first conductive part 1021 changes from the first voltage to the second voltage, the control sub-circuit 101 controls starting of the power supply apparatus, so that the power supply apparatus provides the charging voltage to the communications interface 103.

According to an embodiment of the present disclosure, a charging control circuit includes a communications interface housing, a communications interface, and a control sub-circuit, where the communications interface housing includes a first conductive part, a second conductive part, and an insulating part, and the insulating part is disposed between the first conductive part and the second conductive part; the first conductive part is connected to a first voltage terminal, and the first voltage terminal is configured to access a first voltage; the second conductive part is connected to a second voltage terminal, the second voltage terminal is configured to access a second voltage, and the first voltage is greater than the second voltage; and the control sub-circuit is connected to the first conductive part and the communications interface, and is configured to control, when it is detected that a voltage of the first conductive part changes from the first voltage to the second voltage, starting of a power supply apparatus electrically connected to the communications interface, so that the power supply apparatus provides a charging voltage to the communications interface. In this way, by using the communications interface housing, components required by the charging control circuit may be reduced, the charging control circuit may be simplified, and reliability of a charging control process may be improved.

Figure 2:
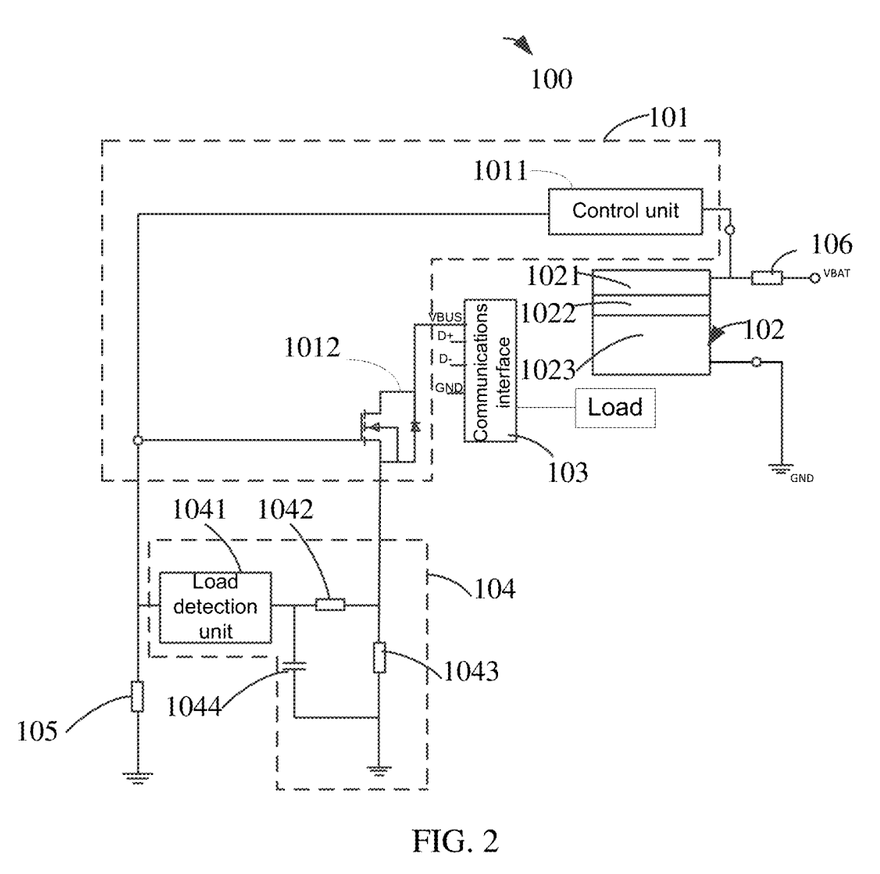
FIG. 2 is a second schematic diagram of a charging control circuit according to an embodiment of the present disclosure.

Referring to FIG. 2, FIG. 2 is a schematic diagram of a charging control circuit according to an embodiment of the present disclosure. As shown in FIG. 2, the charging control circuit 100 includes a communications interface housing 102, a communications interface 103, a control sub-circuit 101, and a load detection sub-circuit 104, where the communications interface housing 102 includes a first conductive part 1021, a second conductive part 1023, and an insulating part 1022, and the insulating part 1022 is disposed between the first conductive part 1021 and the second conductive part 1023; the first conductive part 1021 is connected to a first voltage terminal, and the first voltage terminal is configured to access a first voltage; the second conductive part 1023 is connected to a second voltage terminal, and the second voltage terminal is configured to input a second voltage; and the control sub-circuit 101 is connected to the first conductive part 1021 and the communications interface 103, and is configured to control, when it is detected that a voltage of the first conductive part 1021 changes from the first voltage to the second voltage, starting of a power supply apparatus (not shown in the figure) electrically connected to the communications interface 103, so that the power supply apparatus provides a charging voltage to the communications interface 103.

The load detection sub-circuit 104 is connected to the control sub-circuit 101 and the communications interface 103; the control sub-circuit 101 is also configured to send, after it is detected that the voltage of the first conductive part 1021 changes from the first voltage to the second voltage, a load detection control signal to the load detection sub-circuit 104; the load detection sub-circuit 104 is configured to detect, when the load detection control signal is received, whether the communications interface 103 is electrically connected to a load, and send, to the control sub-circuit 101 when it is detected that the communications interface 103 is not electrically connected to the load, a signal indicating that the load is not accessed; and the control sub-circuit 101 is further configured to control, after the signal indicating that the load is not accessed is received, the power supply apparatus to stop providing the charging voltage to the communications interface 103.

In this embodiment, the load detection control signal is used to trigger the load detection sub-circuit 104 to detect whether the communications interface 103 is electrically connected to the load. For example, after the load detection sub-circuit 104 receives the load detection control signal, whether the communications interface 103 is electrically connected to the load may be detected based on whether there is a current on the communications interface 103. If the current on the communications interface 103 exceeds a first preset current threshold, it is determined that the communications interface 103 is electrically connected to the load, and if the current on the communications interface 103 is less than the first preset current threshold, it is determined that the communications interface 103 is not electrically connected to the load. When the communications interface 103 is not electrically connected to the load, it indicates that the charging voltage does not need to be provided, and needs to be turned off. Therefore, after the signal indicating that the load is not accessed is received, the control sub-circuit 101 controls the power supply apparatus to stop providing the charging voltage to the communications interface 103.

It should be supplemented that the charging control circuit shown in FIG. 2 further includes a current-limiting resistor

106. The first conductive part 1021 is electrically connected to the current-limiting resistor 106, and the first voltage is accessed to the first conductive part 1021 through one terminal of the current-limiting resistor 106. When the first conductive part 1021 and the second conductive part 1023 are both in a disconnected state, the second voltage is accessed to the second conductive part 1023, and the first voltage is greater than the second voltage. In a special case, the second conductive part 1023 may be grounded. In this case, the second voltage is 0. When a charging wire is accessed onto the communications interface 103, the first conductive part 1021 and the second conductive part 1023 are in a conductive state. Because a resistance of the current-limiting resistor 106 is relatively large, a current-limiting function can be played. In this case, the voltage of the first conductive part 1021 changes from the first voltage to the second voltage, and the control sub-circuit 101 may detect that the voltage of the first conductive part 1021 changes from the first voltage to the second voltage.

In this way, when the communications interface is not electrically connected to the load, the power supply apparatus may be controlled to stop providing the charging voltage to the communications interface, so that a risk of short circuiting of the charging control circuit can be reduced.

Optionally, the control sub-circuit 101 is further configured to: control, after the signal indicating that the load is not accessed is received, starting of the power supply apparatus at an interval of a preset time, so that the power supply apparatus provides the charging voltage to the communications interface 103; and send the load detection control signal to the load detection sub-circuit 104.

In this way, after the signal indicating that the load is not accessed is received, the power supply apparatus is started again at the interval of the preset time to provide the charging voltage to the communications interface, and the load detection control signal is sent to the load detection sub-circuit. After it is detected that the load is not accessed, whether the load is accessed may be detected again automatically at an interval of a preset time, so that safety of a charging process is ensured, and in addition, power consumption is reduced, and a use duration of the power supply apparatus is guaranteed.

Optionally, the control sub-circuit 101 includes a control unit 1011 and a switch unit 1012, the control unit 1011 is connected to the first conductive part 1021 and a control terminal of the switch unit 1012, a first output terminal of the switch unit 1012 is connected to the communications interface 103, and a second output terminal of the switch unit 1012 is connected to a load detection sub-circuit 104; and the control unit 1011 is configured to: after the signal indicating that the load is not accessed is received, input a high-level signal to the control terminal of the switch unit 1012, so that the switch unit 1012 is conducted, and send a power-off control signal to the power supply apparatus through the communications interface 103, where the power-off control signal is used to control the power supply apparatus to stop providing the charging voltage to the communications interface 103.

It should be supplemented that the control terminal of the switch unit 1012 is also connected to a pull-down resistor 105, and the pull-down resistor 105 may prevent the switch unit 1012 from being damaged by the high voltage.

In this way, the control unit 1011 controls conduction of the switch unit 1012, and sends the power-off control signal to the power supply apparatus. The power supply apparatus may be controlled to stop providing the charging voltage to the communications interface 103, so that a risk of short circuiting of the charging control circuit can be reduced.

Optionally, the switch unit 1012 includes a switch transistor, a first electrode of the switch transistor is connected to the control unit 1011, a second electrode of the switch transistor is connected to the communications interface 103, and a third electrode of the switch transistor is connected to the load detection sub-circuit 104.

In this embodiment, the switch transistor includes a metal oxide MOS field effect transistor. For example, the MOS field effect transistor may be a negative-channel metal oxide semiconductor (NMOS) field effect transistor. For example, if the switch transistor is the NMOS field effect transistor, a gate electrode of the NMOS field effect transistor is connected to the control unit 1011, a source electrode of the NMOS field effect transistor is connected to the load detection sub-circuit 104, and a drain electrode of the NMOS field effect transistor is connected to the communications interface 103. As the switch transistor, the NMOS field effect transistor has the advantages of a low cost and a simple circuit structure.

Specifically, contacts of the communications interface 103 may include a power cable VBUS contact, a ground cable GND contact, a positive data cable contact D+, and a negative data cable contact D−. In this embodiment, the drain electrode of the NMOS field effect transistor is connected to the power cable VBUS contact of the communications interface 103.

In this embodiment, the load detection sub-circuit 104 includes a load detection unit 1041, a jumper resistor 1042, a current detection resistor 1043, and a filter capacitor 1044, the load detection unit 1041 is connected to the control unit 1011, and is connected to a first terminal of the jumper resistor 1042, a second terminal of the jumper resistor 1042 and a first terminal of the current detection resistor 1043 are connected to the third electrode of the switch transistor, a first terminal of the filter capacitor 1044 is connected to a first terminal of the jumper resistor 1042, a second terminal of the filter capacitor 1044 is connected to a second terminal of the current detection resistor 1043, and a second terminal of the current detection resistor 1043 is grounded; and the load detection unit 1041 is configured to detect, after the load detection control signal input by the control unit 1011 is received, whether the communications interface 103 is electrically connected to a load, and send, to the control unit 1011 when it is detected that the communications interface 103 is not electrically connected to the load, a signal indicating that the load is not accessed. For example, after the load detection unit 1041 receives the load detection control signal, whether the communications interface 103 is electrically connected to the load may be detected based on whether there is a current on the communications interface 103. If the current on the communications interface 103 exceeds a first preset current threshold, it is determined that the communications interface 103 is electrically connected to the load, and if the current on the communications interface 103 is less than the first preset current threshold, it is determined that the communications interface 103 is not electrically connected to the load.

In this embodiment, the control unit 1011 and the load detection unit 1041 may be different logic circuits integrated in a micro control unit. In this way, the circuits may be simplified. The jumper resistor 1042 may be a zero-ohm resistor. The zero-ohm resistor can improve a protection function and is easy to connect during a debugging process.

Figure 3:
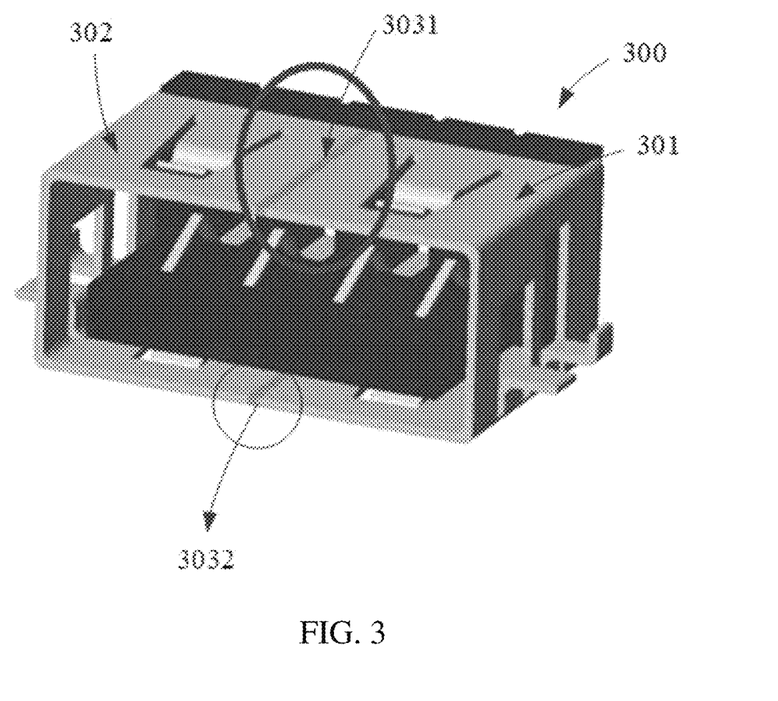
FIG. 3 is a first structural diagram of a communications interface housing according to an embodiment of the present disclosure.

Referring to FIG. 3, FIG. 3 is a first structural diagram of a communications interface housing according to an embodiment of the present disclosure. As shown in FIG. 3, the communications interface housing 300 includes a first conductive part 301, a second conductive part 302, and an insulating part, the insulating part includes a first strip-shaped insulating part 3031 and a second strip-shaped insulating part 3032, a first side face of the first conductive part 301 and a first side face of the second conductive part 302 are connected through the first strip-shaped insulating part 3031, and a second side face of the first conductive part 301 and a second side face of the second conductive part 302 are connected through the second strip-shaped insulating part 3032.

In this way, distinguished from a related communications interface housing, a communications interface housing whose insulating part is disposed between a first conductive part and a second conductive part may be provided.

Figure 4:
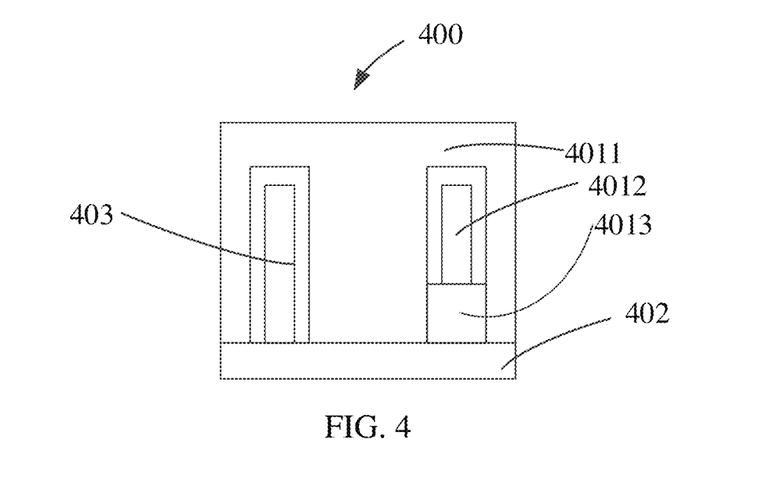
FIG. 4 is a second structural diagram of a communications interface housing according to an embodiment of the present disclosure.

Referring to FIG. 4, FIG. 4 is a first structural diagram of a communications interface housing according to an embodiment of the present disclosure.

As shown in FIG. 4, the communications interface housing 400 includes a housing body, a spring plate 403 independent of the housing body, and an insulating base 402, the housing body includes a first spring plate 4012, a connecting part 4013, and a base part 4011, the first spring plate 4012 is connected to base part 4011 through the connecting part 4013, the first spring plate 4012, the connecting part 4013, the base part 4011, and the spring plate 403 are made of a conductive material, the spring plate 403 is used as a first conductive part, the housing body is used as a second conductive part, and an insulating medium between the housing body and the spring plate is used as an insulating part.

For example, the housing body may be made of metal, and the spring plate 403 may be made of metal.

In this way, distinguished from a related communications interface housing, a communications interface housing whose insulating part is disposed between a first conductive part and a second conductive part may be provided.

Figure 5:
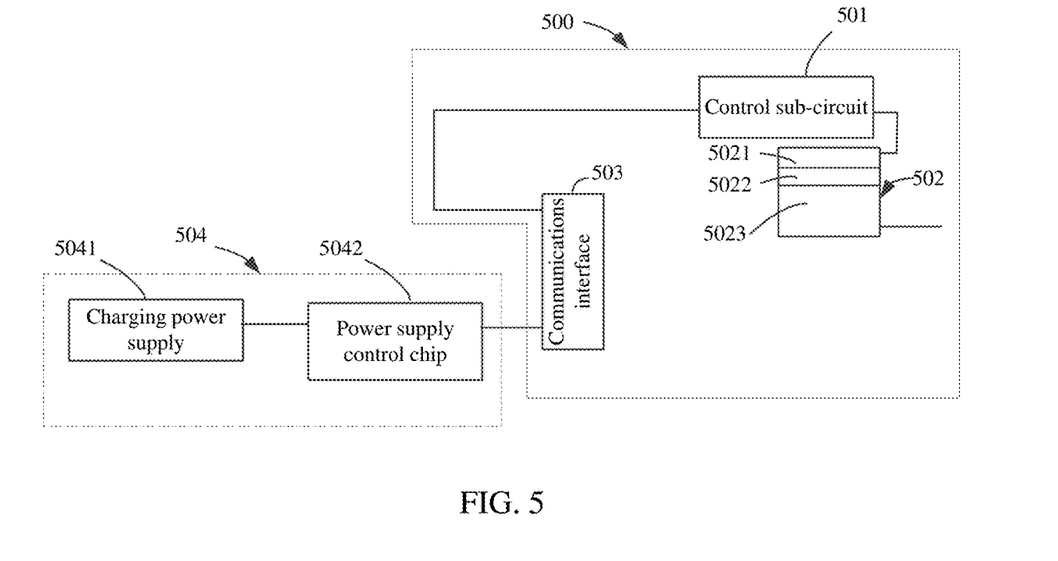
FIG. 5 is a schematic diagram of a charging circuit according to an embodiment of the present disclosure.

Referring to FIG. 5, FIG. 5 is a schematic diagram of a charging circuit according to an embodiment of the present disclosure. The charging circuit includes a charging control circuit 500 and a power supply apparatus 504, where the charging control circuit 500 includes a communications interface housing 502, a communications interface 503, and a control sub-circuit 501; the communications interface housing 502 includes a first conductive part 5021, a second conductive part 5023, and an insulating part 5022, and the insulating part 5022 is disposed between the first conductive part 5021 and the second conductive part 5023; the first conductive part 5021 is connected to a first voltage terminal, and the first voltage terminal is configured to access a first voltage; the second conductive part 5023 is connected to a second voltage terminal, and the second voltage terminal is configured to input a second voltage; and the control sub-circuit 501 is connected to the first conductive part 5021 and the communications interface 503, and is configured to control, when it is detected that a voltage of the first conductive part 5021 changes from the first voltage to the second voltage, starting of the power supply apparatus 504 electrically connected to the communications interface 503, so that the power supply apparatus 504 provides a charging voltage to the communications interface 503.

Optionally, the power supply apparatus includes a charging power supply and a power supply control chip; and the control sub-circuit 501 is configured to send, when it is detected that the voltage of the first conductive part 5021 changes from the first voltage to the second voltage, a power-on control signal to the power supply control chip 5042 through the communications interface 503, to control the power supply control chip 5042 to start the charging power supply 5041, so that the charging power supply 5041 provides a charging voltage to the communications interface 503.

The charging control circuit 500 provided in this embodiment has the same functions as those of the charging control circuit 100 shown in FIG. 1 and FIG. 2. To avoid repetition, details are not described herein again.

In this embodiment, by using the communications interface housing, components required by the charging control circuit may be reduced, the charging control circuit may be simplified, and reliability of a charging control process may be improved.

An embodiment of the present disclosure further provides an electronic device. The electronic device includes the foregoing charging circuit.

In this embodiment of the present disclosure, the foregoing electronic device may be any terminal device including dual cameras, for example, a mobile phone, a tablet computer, a laptop computer, a personal digital assistant (PDA), a mobile Internet device (MID), or a wearable device.

In this embodiment, the electronic device uses a communications interface housing, so that components required by a charging control circuit may be reduced, the charging control circuit may be simplified, and reliability of a charging control process may be improved.

Figure 6:
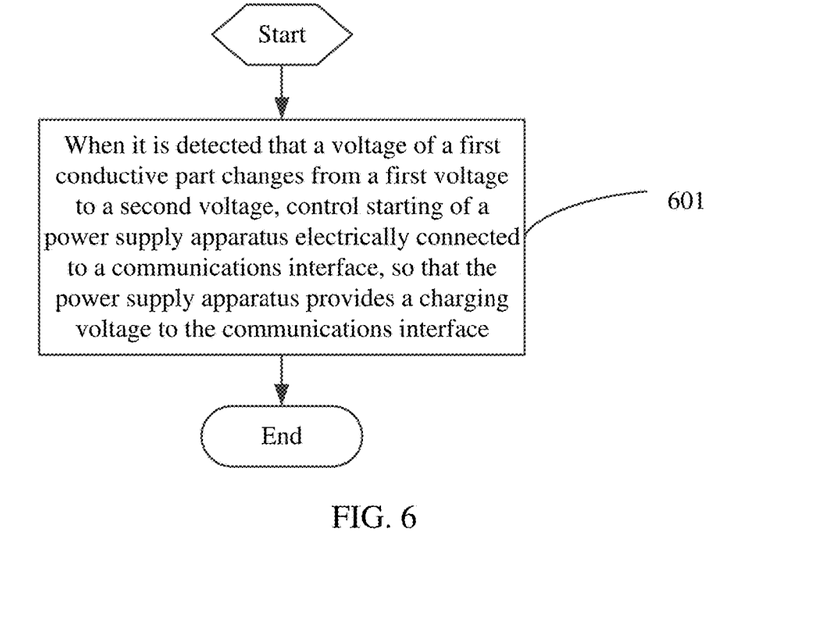
FIG. 6 is a first flowchart of a charging control method according to an embodiment of the present disclosure.

Referring to FIG. 6, FIG. 6 is a flowchart of a charging control method according to an embodiment of the present disclosure. As shown in FIG. 6, the method is applied to the charging circuit in the foregoing embodiment. The method includes the following step:

Step 601: When it is detected that a voltage of a first conductive part changes from a first voltage to a second voltage, control starting of a power supply apparatus electrically connected to a communications interface, so that the power supply apparatus provides a charging voltage to the communications interface.

In this embodiment, the power supply apparatus may be a mobile power supply apparatus including a power supply control chip and a charging power supply. The communications interface may include a universal serial bus (USB) interface, and the communications interface housing may be a USB interface housing.

Because an insulating part is disposed between the first conductive part and a second conductive part, without assistance of another object, the first conductive part and the second conductive part are in a disconnected state. In this case, the voltage accessed by the first conductive part is the first voltage. When the communications interface accesses a load, the accessed load may conduct the first conductive part with the second conductive part, so that the voltage of the first conductive part changes from the first voltage to the second voltage.

When a control sub-circuit detects that the voltage of the first conductive part changes from the first voltage to the second voltage, it indicates that a charging wire is accessed onto the communications interface, and the charging voltage needs to be provided to the communications interface. Therefore, when it is detected that the first conductive part accesses the first voltage, the control sub-circuit controls starting of the power supply apparatus, so that the power supply apparatus provides the charging voltage to the communications interface.

According to the charging control method in this embodiment of the present disclosure, when it is detected that the voltage of the first conductive part changes from the first voltage to the second voltage, the control sub-circuit controls starting of the power supply apparatus, so that the power supply apparatus provides the charging voltage to the communications interface. In this way, by using the communications interface housing, components required by the charging control circuit may be reduced, the charging control circuit may be simplified, and reliability of a charging process may be improved.

Figure 7:
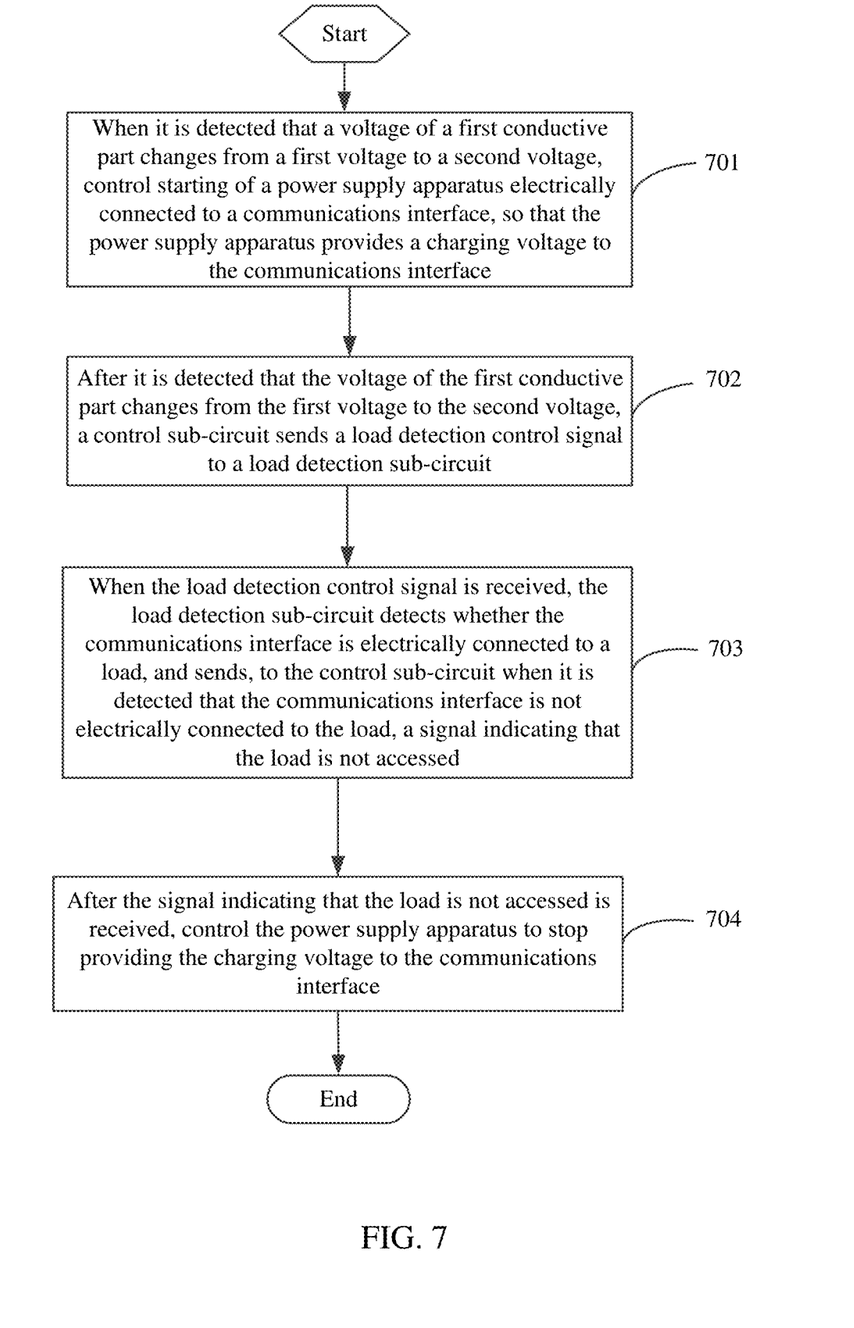
FIG. 7 is a second flowchart of a charging control method according to an embodiment of the present disclosure.

Referring to FIG. 7, FIG. 7 is a flowchart of a charging control method according to an embodiment of the present disclosure. As shown in FIG. 7, the method is applied to the charging circuit in the foregoing embodiment. The method includes the following steps.

Step 701: When it is detected that a voltage of a first conductive part changes from a first voltage to a second voltage, control starting of a power supply apparatus electrically connected to a communications interface, so that the power supply apparatus provides a charging voltage to the communications interface.

For implementation processes and beneficial effects of this step, refer to the description in Step 601. Details are not described herein again.

Step 702: After it is detected that the voltage of the first conductive part changes from the first voltage to the second voltage, a control sub-circuit sends a load detection control signal to a load detection sub-circuit.

In this embodiment, the load detection control signal is used to trigger the load detection sub-circuit 104 to detect whether the communications interface 103 is electrically connected to the load.

Step 703: When the load detection control signal is received, the load detection sub-circuit detects whether the communications interface is electrically connected to a load, and sends, to the control sub-circuit when it is detected that the communications interface is not electrically connected to the load, a signal indicating that the load is not accessed.

For example, after the load detection sub-circuit 104 receives the load detection control signal, whether the communications interface 103 is electrically connected to the load may be detected based on whether there is a current on the communications interface 103. If the current on the communications interface 103 exceeds a first preset current threshold, it is determined that the communications interface 103 is electrically connected to the load, and if the current on the communications interface 103 is less than the first preset current threshold, it is determined that the communications interface 103 is not electrically connected to the load.

Step 704: After the signal indicating that the load is not accessed is received, control the power supply apparatus to stop providing the charging voltage to the communications interface.

In this embodiment, when the communications interface 103 is not electrically connected to the load, it indicates that the charging voltage does not need to be provided, and needs to be turned off. Therefore, after the signal indicating that the load is not accessed is received, the control sub-circuit 101 sends a power-off control signal to a power supply control chip, to control the power supply control chip to turn off the power supply apparatus.

It should be supplemented that after step 704, the method may further include the following steps:

after the signal indicating that the load is not accessed is received, controlling, by the control sub-circuit, starting of the power supply apparatus at an interval of a preset time, so that the power supply apparatus provides the charging voltage to the communications interface; and sending, by the load detection sub-circuit, the load detection control signal to the load detection sub-circuit.

In this way, after the signal indicating that the load is not accessed is received, the power supply apparatus is started again at the interval of the preset time to provide the charging voltage to the communications interface, the load detection control signal is sent to the load detection sub-circuit, and whether the load is accessed may be detected again automatically based on the load detection control signal, so that safety of a charging process is ensured, and in addition, power consumption is reduced, and a use duration of the power supply apparatus is guaranteed.

According to the charging control method in this embodiment of the present disclosure, when it is detected that a voltage of a first conductive part changes from a first voltage to a second voltage, starting of a power supply apparatus electrically connected to a communications interface is controlled, so that the power supply apparatus provides a charging voltage to the communications interface; after it is detected that the voltage of the first conductive part changes from the first voltage to the second voltage, a control sub-circuit sends a load detection control signal to a load detection sub-circuit; when the load detection control signal is received, the load detection sub-circuit detects whether the communications interface is electrically connected to a load, and sends, to the control sub-circuit when it is detected that the communications interface is not electrically connected to the load, a signal indicating that the load is not accessed; and after the signal indicating that the load is not accessed is received, the power supply apparatus is controlled to stop providing the charging voltage to the communications interface. In this way, by using the communications interface housing, components required by the charging control circuit may be reduced, the charging control circuit may be simplified, and reliability and safety of a charging control process may be improved.

Figure 8:
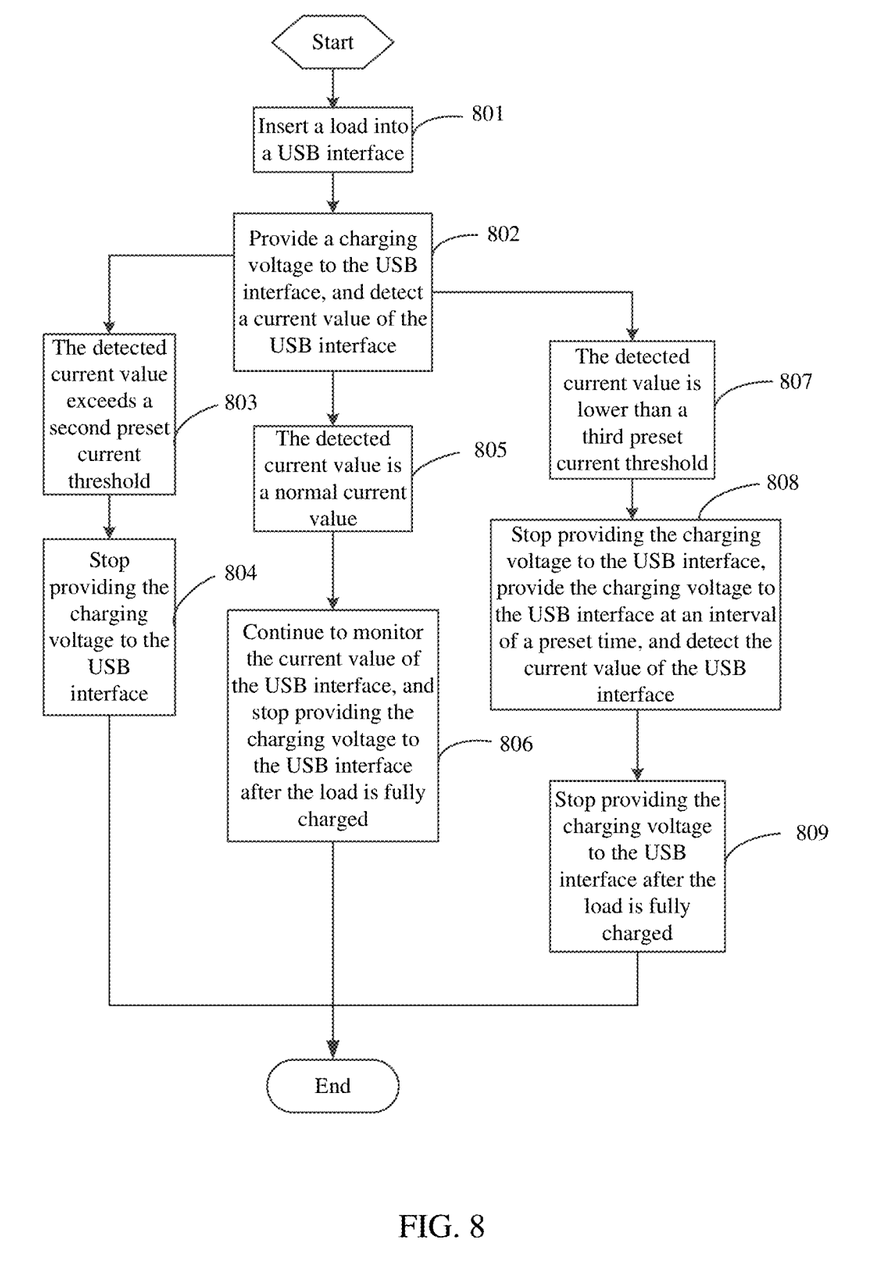
FIG. 8 is a third flowchart of a charging control method according to an embodiment of the present disclosure.

Referring to FIG. 8, FIG. 8 is a flowchart of a charging control method according to an embodiment of the present disclosure. As shown in FIG. 8, the method is applied to the charging circuit in the foregoing embodiment. It should be supplemented that a communications interface in the charging circuit is specifically a USB interface, and a communications interface housing is specifically a USB interface housing; the USB interface housing includes a first conductive part, a second conductive part, and an insulating part, and the insulating part is disposed between the first conductive part and the second conductive part; the first conductive part is connected to a first voltage terminal, and the first voltage terminal is configured to access a first voltage; the second conductive part is connected to a second voltage terminal, the second voltage terminal is configured to access a second voltage, and the first voltage is greater than the second voltage; a charging power supply is connected to the communications interface through a power supply control chip; a control sub-circuit is connected to the first conductive part and the communications interface; and a load detection sub-circuit is connected to the control sub-circuit and the USB interface. The method includes the following steps.

Step 801: Insert a load into the USB interface.

In this embodiment, the load may be a mobile terminal, such as a mobile phone or a tablet computer. For example, a load such as a mobile phone may be accessed to the USB interface through a USB cable.

Step 802: Provide a charging voltage to the USB interface, and detect a current value of the USB interface.

Step 802 may include the following steps: when it is detected that a voltage of the first conductive part changes from the first voltage to the second voltage, controlling, by the control sub-circuit, starting of a power supply apparatus, so that the power supply apparatus provides the charging voltage to the USB interface; and detecting, by the load detection sub-circuit, the current value of the USB interface.

Step 803: The detected current value exceeds a second preset current threshold.

In this embodiment, the second preset current threshold may be set. When the detected current value exceeds the second preset current threshold, it is determined that the detected current value is over-current.

Step 804: Stop providing the charging voltage to the USB interface.

Step 804 may include the following steps:

sending, by the control sub-circuit, a power-off control signal to the power supply control chip, to control the power supply control chip to turn off the charging power supply; and stopping providing the charging voltage to the USB interface.

Step 805: The detected current value is a normal current value.

In this embodiment, the normal current value may be preset. The normal current value is a current value when the load is normally charged through the USB interface, and may be a current value range.

Step 806: Continue to monitor the current value of the USB interface, and stop providing the charging voltage to the USB interface after the load is fully charged.

In this way, safety of a charging process may be ensured, and power consumption may be reduced.

Step 807: The detected current value is lower than a third preset current threshold.

In this embodiment, the third preset current threshold may be preset. The third preset current threshold may be a relatively small current value, or may be 0. If the detected current value is lower than the third preset current threshold, it indicates that the load is not accessed to the USB interface.

Step 808: Stop providing the charging voltage to the USB interface, provide the charging voltage to the USB interface at an interval of a preset time, and detect the current value of the USB interface.

Step 808 may include the following steps: sending, by the control sub-circuit, a power-off control signal to the power supply control chip, to control the power supply control chip to turn off the charging power supply; stopping providing the charging voltage to the USB interface; sending, by the control sub-circuit, a power-on control signal to the power supply control chip through the USB interface at the interval of the preset time, to control the power supply control chip to start the charging power supply, so that the charging power supply provides the charging voltage to the communications interface; sending, by the load detection sub-circuit, a load detection control signal to the load detection sub-circuit; and detecting, by the load detection sub-circuit, the current value of the USB interface.

Step 809: Stop providing the charging voltage to the USB interface after the load is fully charged.

In this embodiment, Step 809 may include the following steps: sending, by the control sub-circuit, the power-off control signal to the power supply control chip, to control the power supply control chip to turn off the charging power supply; and stopping providing the charging voltage to the USB interface.

According to the charging control method in this embodiment of the present disclosure, the charging power supply is started again at the interval of the preset time to provide the charging voltage to the USB interface, the current value of the USB interface is detected, and whether the load is accessed to the USB interface may be detected again automatically, so that safety of a charging process is ensured, and in addition, power consumption is reduced, and a use duration of the charging power supply is guaranteed.

An embodiment of the present disclosure further provides a computer readable storage medium, where the computer readable storage medium stores a computer program, when the computer program is executed by the processor, the processes of the foregoing embodiments of the charging control method are implemented, and the same technical effects can be achieved. To avoid repetition, details are not described herein again. The computer readable storage medium may be a read-only memory (ROM for short), a random access memory (RAM for short), a magnetic disk, a compact disc, or the like.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the related technologies may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of the present disclosure essentially, or the part contributing to the prior art, or some of the technical solutions may be implemented in a form of a software product. The computer software product is stored in a storage medium, and includes a plurality of instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the foregoing embodiments may be implemented by a computer program controlling related hardware. The program may be stored in a computer readable storage medium. When the program runs, the processes of the methods in the embodiments are performed. The foregoing storage medium may include: a magnetic disk, an optical disc, a read-only memory ROM), a random access memory (RAM), or the like.

It can be understood that those embodiments described in the embodiments of the present disclosure can be implemented by hardware, software, firmware, middleware, microcode, or a combination thereof. For implementation by hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing function modules (for example, a process and a function) in the embodiments of the present disclosure. Software codes may be stored in the memory and executed by the processor. The memory may be implemented inside or outside the processor.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

What is claimed is:

1. A charging control circuit, comprising a communications interface housing, a communications interface, and a control sub-circuit, wherein
    the communications interface housing comprises a first conductive part, a second conductive part, and an insulating part, and the insulating part is disposed between the first conductive part and the second conductive part;
    the first conductive part is connected to a first voltage terminal, and the first voltage terminal is configured to access a first voltage;
    the second conductive part is connected to a second voltage terminal, the second voltage terminal is configured to access a second voltage, and the first voltage is greater than the second voltage; and
    the control sub-circuit is connected to the first conductive part and the communications interface, and is configured to control, when it is detected that a voltage of the first conductive part changes from the first voltage to the second voltage, starting of a power supply apparatus electrically connected to the communications interface, so that the power supply apparatus provides a charging voltage to the communications interface.

2. The charging control circuit according to claim 1, further comprising a load detection sub-circuit, wherein the load detection sub-circuit is connected to the control sub-circuit and the communications interface, wherein
    the control sub-circuit is further configured to send, after it is detected that the voltage of the first conductive part changes from the first voltage to the second voltage, a load detection control signal to the load detection sub-circuit;
    the load detection sub-circuit is configured to detect, when the load detection control signal is received, whether the communications interface is electrically connected to a load, and send, to the control sub-circuit when it is detected that the communications interface is not electrically connected to the load, a signal indicating that the load is not accessed; and
    the control sub-circuit is further configured to control, after the signal indicating that the load is not accessed is received, the power supply apparatus to stop providing the charging voltage to the communications interface.

3. The charging control circuit according to claim 2, wherein the control sub-circuit is further configured to: control, after the signal indicating that the load is not accessed is received, starting of the power supply apparatus at an interval of a preset time, so that the power supply apparatus provides the charging voltage to the communications interface; and send the load detection control signal to the load detection sub-circuit.

4. The charging control circuit according to claim 2, wherein the control sub-circuit comprises a control unit and a switch unit, the control unit is connected to the first conductive part and a control terminal of the switch unit, a first output terminal of the switch unit is connected to the communications interface, and a second output terminal of the switch unit is connected to a load detection sub-circuit; and the control unit is configured to: after the signal indicating that the load is not accessed is received, input a high-level signal to the control terminal of the switch unit, so that the switch unit is conducted, and send a power-off control signal to the power supply apparatus through the communications interface, wherein the power-off control signal is used to control the power supply apparatus to stop providing the charging voltage to the communications interface.

5. The charging control circuit according to claim 4, wherein the switch unit comprises a switch transistor, a first electrode of the switch transistor is connected to the control unit, a second electrode of the switch transistor is connected to the communications interface, and a third electrode of the switch transistor is connected to the load detection sub-circuit.

6. The charging control circuit according to claim 5, wherein the load detection sub-circuit comprises a load detection unit, a jumper resistor, a current detection resistor, and a filter capacitor, the load detection unit is connected to the control unit, and is also connected to a first terminal of the jumper resistor, a second terminal of the jumper resistor and a first terminal of the current detection resistor are connected to the third electrode of the switch transistor, a first terminal of the filter capacitor is connected to the first terminal of the jumper resistor, a second terminal of the filter capacitor is connected to a second terminal of the current detection resistor, and the second terminal of the current detection resistor is grounded; and the load detection unit is configured to detect, after the load detection control signal input by the control unit is received, whether the communications interface is electrically connected to a load, and send, to the control unit when it is detected that the communications interface is not electrically connected to the load, a signal indicating that the load is not accessed.

7. The charging control circuit according to claim 1, wherein the insulating part comprises a first strip-shaped insulating part and a second strip-shaped insulating part, wherein a first side face of the first conductive part and a first side face of the second conductive part are connected through the first strip-shaped insulating part, and a second side face of the first conductive part and a second side face of the second conductive part are connected through the second strip-shaped insulating part.

8. The charging control circuit according to claim 1, wherein the communications interface housing comprises a housing body and a spring plate independent of the housing body, the spring plate is used as the first conductive part, the housing body is used as the second conductive part, and an insulating medium between the housing body and the spring plate is used as the insulating part.

9. A charging circuit, comprising a charging control circuit and a power supply apparatus, wherein the charging control circuit comprises a communications interface housing, a communications interface, and a control sub-circuit, the power supply apparatus is electrically connected to the communications interface of the charging control circuit;

the communications interface housing comprises a first conductive part, a second conductive part, and an insulating part, and the insulating part is disposed between the first conductive part and the second conductive part;

the first conductive part is connected to a first voltage terminal, and the first voltage terminal is configured to access a first voltage;

the second conductive part is connected to a second voltage terminal, the second voltage terminal is configured to access a second voltage, and the first voltage is greater than the second voltage; and the control sub-circuit is connected to the first conductive part and the communications interface, and is configured to control, when it is detected that a voltage of the first conductive part changes from the first voltage to the second voltage, starting of the power supply apparatus, so that the power supply apparatus provides a charging voltage to the communications interface.

10. The charging circuit according to claim 9, wherein the power supply apparatus comprises a charging power supply and a power supply control chip;

the charging power supply is electrically connected to the communications interface through the power supply control chip; and the control sub-circuit is configured to send, when it is detected that a voltage of the first conductive part changes from the first voltage to the second voltage, a power-on control signal to the power supply control chip through the communications interface, to control the power supply control chip to start the charging power supply, so that the charging power supply provides the charging voltage to the communications interface.

11. The charging circuit according to claim 9, wherein the charging control circuit further comprises a load detection sub-circuit, the load detection sub-circuit is connected to the control sub-circuit and the communications interface;

the control sub-circuit is further configured to send, after it is detected that the voltage of the first conductive part changes from the first voltage to the second voltage, a load detection control signal to the load detection sub-circuit;

the load detection sub-circuit is configured to detect, when the load detection control signal is received, whether the communications interface is electrically connected to a load, and send, to the control sub-circuit when it is detected that the communications interface is not electrically connected to the load, a signal indicating that the load is not accessed; and the control sub-circuit is further configured to control, after the signal indicating that the load is not accessed is received, the power supply apparatus to stop providing the charging voltage to the communications interface.

12. The charging circuit according to claim 11, wherein the control sub-circuit is further configured to: control, after the signal indicating that the load is not accessed is received, starting of the power supply apparatus at an interval of a preset time, so that the power supply apparatus provides the charging voltage to the communications interface; and send the load detection control signal to the load detection sub-circuit.

13. The charging circuit according to claim 11, wherein the control sub-circuit comprises a control unit and a switch unit, the control unit is connected to the first conductive part and a control terminal of the switch unit, a first output terminal of the switch unit is connected to the communications interface, and a second output terminal of the switch unit is connected to a load detection sub-circuit; and the control unit is configured to: after the signal indicating that the load is not accessed is received, input a high-level signal to the control terminal of the switch unit, so that the switch unit is conducted; and send a power-off control signal to the power supply apparatus through the communications interface, wherein the power-off control signal is used to control the power supply apparatus to stop providing the charging voltage to the communications interface.

14. The charging circuit according to claim 13, wherein the switch unit comprises a switch transistor, a first electrode of the switch transistor is connected to the control unit, a second electrode of the switch transistor is connected to the communications interface, and a third electrode of the switch transistor is connected to the load detection sub-circuit.

15. The charging circuit according to claim 14, wherein the load detection sub-circuit comprises a load detection unit, a jumper resistor, a current detection resistor, and a filter capacitor, the load detection unit is connected to the control unit, and is also connected to a first terminal of the jumper resistor, a second terminal of the jumper resistor and a first terminal of the current detection resistor are connected to the third electrode of the switch transistor, a first terminal of the filter capacitor is connected to the first terminal of the jumper resistor, a second terminal of the filter capacitor is connected to a second terminal of the current detection resistor, and the second terminal of the current detection resistor is grounded; and the load detection unit is configured to detect, after the load detection control signal input by the control unit is received, whether the communications interface is electrically connected to a load, and send, to the control unit when it is detected that the communications interface is not electrically connected to the load, a signal indicating that the load is not accessed.

16. An electronic device, comprising a charging circuit, wherein the charging circuit comprises a charging control circuit and a power supply apparatus, the charging control circuit comprises a communications interface housing, a communications interface, and a control sub-circuit, the power supply apparatus is electrically connected to the communications interface of the charging control circuit;

the communications interface housing comprises a first conductive part, a second conductive part, and an insulating part, and the insulating part is disposed between the first conductive part and the second conductive part;

the first conductive part is connected to a first voltage terminal, and the first voltage terminal is configured to access a first voltage;

the second conductive part is connected to a second voltage terminal, the second voltage terminal is configured to access a second voltage, and the first voltage is greater than the second voltage; and the control sub-circuit is connected to the first conductive part and the communications interface, and is configured to control, when it is detected that a voltage of the first conductive part changes from the first voltage to the second voltage, starting of the power supply apparatus, so that the power supply apparatus provides a charging voltage to the communications interface.

17. The electronic device according to claim 16, wherein the power supply apparatus comprises a charging power supply and a power supply control chip;

the charging power supply is electrically connected to the communications interface through the power supply control chip; and the control sub-circuit is configured to send, when it is detected that a voltage of the first conductive part changes from the first voltage to the second voltage, a power-on control signal to the power supply control chip through the communications interface, to control the power supply control chip to start the charging power supply, so that the charging power supply provides the charging voltage to the communications interface.

18. A charging control method, applied to the charging circuit according to claim 9, and comprising:

when it is detected that a voltage of a first conductive part changes from a first voltage to a second voltage, controlling starting of a power supply apparatus electrically connected to a communications interface, so that the power supply apparatus provides a charging voltage to the communications interface.

19. The charging control method according to claim 18, further comprising:

after it is detected that the voltage of the first conductive part changes from the first voltage to the second voltage, sending, by a control sub-circuit, a load detection control signal to a load detection sub-circuit;

when the load detection control signal is received, detecting, by the load detection sub-circuit, whether the communications interface is electrically connected to a load, and sending, by the load detection sub-circuit, to the control sub-circuit when it is detected that the communications interface is not electrically connected to the load, a signal indicating that the load is not accessed; and after the signal indicating that the load is not accessed is received, controlling the power supply apparatus to stop providing the charging voltage to the communications interface.

20. The charging control method according to claim 19, further comprising:

after the signal indicating that the load is not accessed is received, controlling, by the control sub-circuit, starting of the power supply apparatus at an interval of a preset time, so that the power supply apparatus provides the charging voltage to the communications interface; and sending, by the control sub-circuit, the load detection control signal to the load detection sub-circuit.

* * * * *